United States Patent [19]
Myers

[11] Patent Number: 5,800,890
[45] Date of Patent: Sep. 1, 1998

[54] HEAT FUSIBLE LAMINATES AND METHODS FOR PREPARATION AND USE THEREOF

[75] Inventor: Robert A. Myers, Huntsville, Tex.

[73] Assignee: M & M Designs, Inc., Huntsville, Tex.

[21] Appl. No.: 679,829

[22] Filed: Jul. 15, 1996

[51] Int. Cl.$^6$ ............................................. C09J 7/02
[52] U.S. Cl. .................. 428/41.7; 428/41.8; 428/42.1;
428/200; 428/201; 428/202; 428/207; 428/349;
428/355 EW
[58] Field of Search ........................... 428/41.7, 41.8,
428/42.1, 200, 201, 202, 207, 349, 355 EN

[56] References Cited

U.S. PATENT DOCUMENTS 4,515,849  5/1985  Keino .
4,536,434  8/1985  Magnotta .
4,555,436  11/1985  Guertsen .
4,657,803  4/1987  Pernicano .
4,664,735  5/1987  Pernicano .

*Primary Examiner*—Jenna Davis
*Attorney, Agent, or Firm*—Bill B. Berryhill

[57] ABSTRACT

A heat fusible laminate for imprinting a design on an article of stretchable fabric such as polyamide, polyester and other synthetic materials. The laminate includes a release layer, a first adhesive layer, at least one ink layer of heat fusible composition and a second adhesive layer. The laminate is responsive to heat and pressure, when placed with the second adhesive layer against the fabric article, for securing the design to the fabric and allowing removal of the release layer therefrom.

13 Claims, 1 Drawing Sheet

HEAT FUSIBLE LAMINATES AND METHODS FOR PREPARATION AND USE THEREOF

BACKGROUND OF THE INVENTION

1. Field of the Invention

The present invention pertains to pre-selected designs which are transferrable, by application of heat and/or pressure, from a pre-prepared composite or laminate to an article of manufacture. More specifically, the present invention pertains to laminates on which a design is printed and from which the design may be transferred and imprinted on an article by application of heat and pressure. In particular, the present invention pertains to heat fusible laminates and methods of preparing and imprinting designs carried by the laminates on articles of stretchable fabric such as nylon, polyester and other synthetic materials.

2. Description of the Prior Art.

Materials and methods for transferring a design to another object have long been in existence. However, many new materials and methods have been developed in recent years for specific purposes.

A typical prior art heat transferrable article for imprinting designs onto another article involves decorative laminates consisting of a paper base sheet or layer coated with a wax or other release layer over which a design is imprinted in ink. The laminate is placed against the article on which the design is to be imprinted, with the ink design of the laminate in contact therewith. Then the base sheet or layer is subjected to heat and pressure until the wax or release layer begins to melt so that the paper base sheet can be released from the wax layer. The paper sheet is immediately removed leaving the design firmly affixed to the article to which it has been transferred. In some cases, a wax layer is left on top of the ink design for protection thereof.

Some heat transfer laminates have been specifically designed for transferring a design or label to plastic bottles. Examples may be seen in U.S. Pat. Nos. 3,516,904 and 3,616,015. In these applications, the base sheet of the heat transferrable laminate is typically coated with a wax or polymeric release layer which, after transfer of the ink design thereon, is left as a coating over the design.

In recent years, heat transfers have become increasingly popular for imprinting designs on fabric articles such as t-shirts, jackets, dresses, caps, etc. Representatives of these types of heat transferrable printing materials and processes may be seen in U.S. Pat. Nos. 4,142,929; 4,515,849; 4,657,803; 4,664,735; 4,536,434 and 4,555,436. Most of these methods of transfer printing are accomplished with a laminate having a base sheet or layer of some type of paper, cellophane, synthetic resin, etc. The base sheet or layer would be typically coated with some type of adhesive on top of which a layer of some type of ink may be printed or deposited. The ink layer is in the form of a design which is to be transferred or imprinted on the fabric of the article on which the design is desired. Then the ink design layer is coated with a second adhesive layer.

The laminate is placed against the fabric of the article on which the design is desired with the second adhesive layer in contact therewith. Then heat and pressure is applied to the base sheet or layer side of the laminate until the heat is sufficient to melt the second adhesive layer enough to bond the design to the fabric and until the first adhesive layer is melted enough to allow release of the base sheet or layer. After application of heat and pressure, the base sheet is removed and the remaining components of the laminate are allowed to cool, leaving the design imprinted or permanently bonded to the fabric.

Materials in many different combinations have been utilized in developing heat transfer laminates and methods for printing on different materials. The adhesives and heat compounds must be compatible with each other and with the fabric on which the design is to be imprinted. Materials suitable for cotton fabrics may not be suitable for synthetic fabrics. Materials suitable for some types of synthetic materials may not be suitable for others. For example, some fabrics having a high content of nylon and other polyamide and polyester materials are very stretchable. In such cases, the adhesive and ink compounds utilized must, after application to the fabric, exhibit the same stretchable characteristics. If not, the design, after wearing, washing and other handling, may crack or be released from the fabric on which it has been imprinted.

In summary, the composition of heat transferrable laminates must be specifically selected for the fabric on which its design is to be imprinted. The search continues for specific materials, particularly for those which more closely exhibit the characteristics of stretchable synthetics such as nylon and other polyamide and polyester materials.

SUMMARY OF THE PRESENT INVENTION

The present invention provides a heat fusible laminate for imprinting a design on an article of stretchable fabric such as polyamide, including nylon, polyester and other synthetic materials. The laminate comprises a base or release layer, a first adhesive layer, at least one ink layer and a second adhesive layer. The laminate is responsive to heat and pressure, when placed with the second adhesive layer against the article, for securing the design to the article and allowing the removal of the release or base layer therefrom. The laminate is characterized by the ink layer being of a pigmented heat fusible composition. In a preferred embodiment the pigmented fusible ink composition is made from a mixture of polyvinyl chloride, phthalate esters, inert fillers and one or more organic and/or inorganic compounds.

The heat fusible laminate is also characterized by unique compositions of its first and second adhesive layers. The first adhesive layer may comprise a mixture of vinyl polymers, polyester polymers and other ester compounds which are compatible with the fusible ink composition. The second adhesive layer may comprise a mixture of amide polymers and other compounds, particularly compatible with the fabrics to which the design is to be imprinted.

After the laminate has been properly prepared, it is pressed against the fabric on which its design is to be imprinted with the second adhesive layer in contact therewith. The laminate is then heated to a temperature sufficient for fusible bonding of the design to the fabric and for removal of the release or base layer from the laminate. After heating is terminated, the released layer is removed and the laminate, sans the release layer, is allowed to cool for permanent imprinting of the design on the fabric.

The unique adhesive and ink combinations of the present invention result in the imprinting of a design on stretchable materials such as nylon and other polyamide and polyester materials, which exhibits the same characteristics of the fabric. The design becomes fused to the fabric giving a stretchable, permanent bond with the fabric and having the appearance of being printed directly on the fabric. The surface of the design appears glossy with adequate ink build

DESCRIPTION OF PREFERRED EMBODIMENTS

Figure 1:
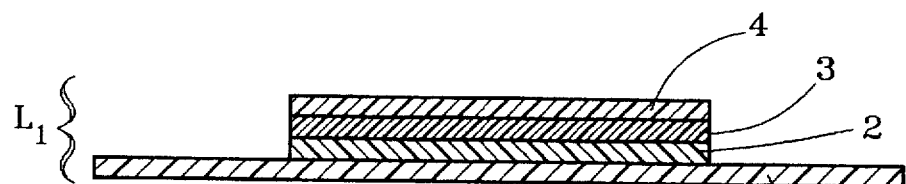
FIG. 1 is a cross-sectional view of a heat fusible laminate suitable for imprinting a design on an article of stretchable fabric, according to a preferred embodiment of the invention.

Referring first to FIG. 1, there is shown a heat fusible laminate L, having four components: base sheet or release layer 1, a first adhesive layer 2, an ink layer 3, and a second adhesive layer 4. The base sheet or release layer 1 could be any number of types of paper cellophane, synthetic resin film or the like. In the preferred embodiment, it is paper, i.e. Wynstone 50 lb. LR2.

The first adhesive layer 2 is a clear adhesive which is screened-printed on the release paper 1. The first adhesive layer 2 is preferably made from a mixture of vinyl polymers, polyester polymers and other ester compounds. In preferred embodiments, the mixture comprises polyvinyl chloride, copolyester and phthalate esters. In a specific preferred embodiment, the first adhesive layer is made from a mixture which comprises 15% to 40% polyvinyl chloride, 15% to 40% copolyester and 15% to 40% phthalate esters. After the first adhesive layer is printed onto the release paper 1, it is gelled in a dryer oven, e.g. at 235° F. for eighteen seconds.

After the first adhesive layer has gelled, the pigmented fusible ink layer 3, forming the shape of a selected design, is printed directly on the top thereof. Pigmented fusible inks are normally used for direct printing but are typically not utilized for heat transferrable laminates. In the unique combination of the present invention, the pigmented fusible ink is made from a mixture of vinyl polymers, ester compounds, inert fillers and one or more organic and/or inorganic pigments. In a preferred embodiment, the pigmented fusible ink composition comprises 30% to 60% polyvinyl chloride, 20% to 35% phthalate esters, 10% to 30% inert fillers, 0% to 10% organic pigments and 10% to 30% inorganic pigments. After the ink layer is printed, it is also gelled in a dryer oven.

Figure 2:
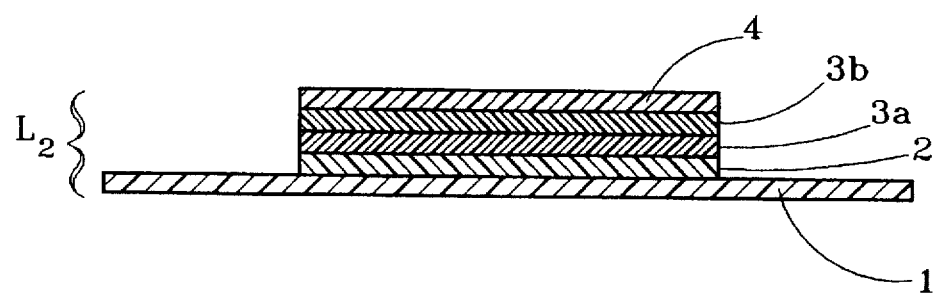
FIG. 2 is a cross-sectional view of a heat fusible laminate suitable for imprinting a design on an article of stretchable fabric, according to another preferred embodiment of the invention.

In some embodiments of the heat fusible laminate, such as laminate $L_2$ shown in FIG. 2, another layer of ink of a pigmented heat fusible composition may be printed over the first layer. In the embodiment of FIG. 2, the first layer of ink is designated 3a and the second layer designated 3b. If two or more layers of pigmented ink are printed on the laminate each of the ink layers is gelled in a dryer oven.

Finally a second adhesive layer 4 is applied over the last ink layer, 3 or 3b. The second adhesive layer 4 is uniquely made from a mixture of amide polymers and other compounds. In a preferred embodiment of the invention, the mixture comprises more than 90% copolyamide and less than 10% caprolactam. This adhesive is a powder like substance and is applied to the top of the gelled pigmented fusible ink layer by means of a shaker/vacuum device. After application of the second or final adhesive layer 4 the layers of the laminate are again gelled in a dryer oven. At this point the laminate, whether in the arrangement of FIG. 1 or FIG. 2, is ready for application to articles of fabric.

Figure 3:
FIG. 3 is a pictorial illustration of a design imprinted on an article of stretchable fabric utilizing a heat fusible laminate such as those shown in FIGS. 1 and 2, according to preferred embodiments of the invention.

The laminate, whether in the layer sequence of FIG. 1 ($L_1$) or FIG. 2 ($L_2$) is then placed against an article of fabric F, such as illustrated is FIG. 3, with the second adhesive layer 4 in contact therewith. The fabric F for which the laminate of the present invention was designed is a stretchable fabric having a high content of nylon or other polyamide and polyester materials. The fabric F is preferably placed on a flat surface of a heat transfer machine. After the laminate is properly placed thereon, the heat platen (not shown) of the heat transfer machine is brought into contact with the laminate and the fabric F. Heat is preferably applied between 350° F. and 450° F. for three to fifteen seconds. At the same time, pressure between 25 psi and 125 psi is applied to the laminate through the heat platen of the heat transfer machine.

After application of heat and pressure for the allotted time, the release sheet or layer 1 is rapidly peeled from the laminate and discarded. The heat fusibly laminate, sans release layer 1, is then fusibly bonded in the form of the desired design D to the fabric F. The design D gives the appearance of having been printed directly on the fabric using the screen printing method. Its surface is glossy with adequate ink build up or "hand". The design is fused and bonded to the fabric F exhibiting the same characteristics thereof. The design has the stretch, feel and wearing characteristics of the fabric itself.

The heat fusible laminate of the present invention and their preparation are especially suitable for decorating stretchable fabrics having high content of nylon and other polyamide and polyester materials. The ink and adhesive layers are unique in combination in this application. The resulting design is uniquely fused and bonded to the types of fabric with which it is intended to be used.

At least two embodiments of the invention and several variations of materials therefor have been described herein. However, other embodiments and variations of materials and preparation thereof will be apparent to those skilled in the art without departing from the invention. Therefore, it is intended that the scope of the invention be limited only by the claims which follow.

I claim:

1. A heat fusible laminate for imprinting a design on an article of stretchable fabric such as polyamide, polyester and other synthetic materials; said laminate comprising a release layer, a first adhesive layer, at least one ink layer and a second adhesive layer; said laminate being responsive to heat and pressure when placed with said second adhesive layer against said article for securing said design to said article and allowing the removal of said release layer therefrom; said laminate being further characterized by said at least one ink layer being of a pigmented heat fusible composition made from a mixture of polyvinyl chloride, phthalate esters, inert filler and one or more inorganic and/or organic compounds.

2. A heat fusible laminate as set forth in claim 1 in which said pigmented heat fusible ink composition comprises 30% to 60% poly-vinyl chloride, 20% to 35% phthalate esters, 10% to 30% inert fillers, 0% to 10% organic pigments and 10% to 30% inorganic pigments.

3. A heat fusible laminate for imprinting a design on an article of stretchable fabric such as polyamide, polyester and other synthetic materials; said laminate comprising a release layer, a first adhesive layer, at least one ink layer and a second adhesive layer; said laminate being responsive to heat and pressure when placed with said second adhesive layer against said article for securing said design to said article and allowing the removal of said release layer therefrom; said laminate being further characterized in that said first adhesive layer is made from a mixture of vinyl polymers, polyester polymers and other ester compounds.

4. A heat fusible laminate as set forth in claim 3 in which said mixture, comprises polyvinyl chloride, copolyester and phthalate esters.

5. A heat fusible laminate as set forth in claim 4 in which said mixture comprises 15% to 40% polyvinyl chloride, 15% to 40% copolyester and 15% to 40% phthalate esters.

6. A heat fusible laminate for imprinting a design on an article of stretchable fabric such a polyamide, polyester and other synthetic materials; said laminate comprising a release layer, a first adhesive layer, at least one ink layer and a second adhesive layer; said laminate being responsive to heat and pressure when placed with said second adhesive layer against said article for securing said design to said article and allowing the removal of said release layer therefrom; said laminate being further characterized in that said second adhesive layer is made from a mixture of amide polymers and other compounds.

7. A heat fusible laminate as set forth in claim 6 in which said mixture comprises copolyamide and caprolactam.

8. A heat fusible laminate as set forth in claim 7 in which said mixture comprises more than 90% copolyamide and less than 10% caprolactam.

9. A heat fusible laminate for imprinting a design on an article of stretchable fabric such as polyamide, polyester and other synthetic materials; said laminate comprising a release layer, a first adhesive layer, at least one ink layer and a second adhesive layer and being responsive to heat and pressure when placed against said article, said second adhesive layer next thereto, for fusibly securing said design thereto and allowing removal of said release layer therefrom; said laminate being characterized in that said first adhesive layer comprises a mixture of vinyl polymers, and polyester polymers; said second adhesive layer comprising a mixture which includes amide polymers.

10. A heat fusible laminate as set forth in claim 9 in which said ink layer is a heat fusible ink comprising a mixture of vinyl polymers, ester compounds, inert filler and one or more organic and/or inorganic pigments.

11. A heat fusible laminate as set forth in claim 10 in which said vinyl polymer of said ink mixture comprises polyvinyl chloride and said ester compounds comprises phthalate esters.

12. A heat fusible laminate as set forth in claim 11 in which said first adhesive layer mixture comprises polyvinyl chloride, phthalate esters and copolyester.

13. A heat fusible laminate as set forth in claim 11 in which said second adhesive layer mixture comprises copolyamide and caprolactam.

* * * * *